United States Patent [19]

Hiraki et al.

[11] 3,908,083

[45] Sept. 23, 1975

[54] TELEVISION RECEIVER

[75] Inventors: Hisao Hiraki, Nishinomiya; Seiro Hasegawa, Ikeda; Hiroshi Shirakusa, Moriguchi, all of Japan

[73] Assignee: Matsushita Electric Industrial Co., Ltd., Kadoma, Japan

[22] Filed: July 1, 1974

[21] Appl. No.: 485,022

Related U.S. Application Data

[63] Continuation of Ser. No. 272,951, July 18, 1972, abandoned.

[30] Foreign Application Priority Data

July 20, 1971 Japan ............................... 46-54493

[52] U.S. Cl. ............................................. 178/7.5 R

[51] Int. Cl.² ............................................ H04N 5/44

[58] Field of Search ......... 178/6, 6.8, 7.5 SC, 6.6 A, 178/6.6 FS

[56] References Cited

UNITED STATES PATENTS

| | | | |
|---|---|---|---|
| 3,229,035 | 1/1966 | Bounsall | 178/6.6 A |
| 3,484,548 | 12/1969 | Kowal et al. | 178/6 |
| 3,705,328 | 12/1972 | Torok | 178/7.5 SE |

*Primary Examiner*—Richard Murray
*Attorney, Agent, or Firm*—Stevens, Davis, Miller & Mosher

[57] ABSTRACT

A television receiver comprising means to record a desired frame of video signal in the broadcast television signal and means to read the recorded signal, said recording means including means to cause zooming or enlarging the recorded picture.

4 Claims, 7 Drawing Figures

TELEVISION RECEIVER

This is a continuation of application Ser. No. 272,951, filed July 18, 1972, now abandoned.

This invention relates to television receivers and, more particularly, to television receivers, in which a desired frame of video signal in the broadcast television signal can be recorded and immediately after the recording a zoomed static picture reproduced from the recorded signal can be displayed on a picture tube.

An object of the invention is to enable snapping a picture in television programs involving quick and rapid motion such as sports programs and observing the snapped picture in a zoomed state.

Another object of the invention is to enable read-out of snapped and recorded picture information immediately after the recording by using such recording means as a storage tube.

The invention will now be described in conjunction with an embodiment thereof with reference to the accompanying drawings, in which.

Figure 1:
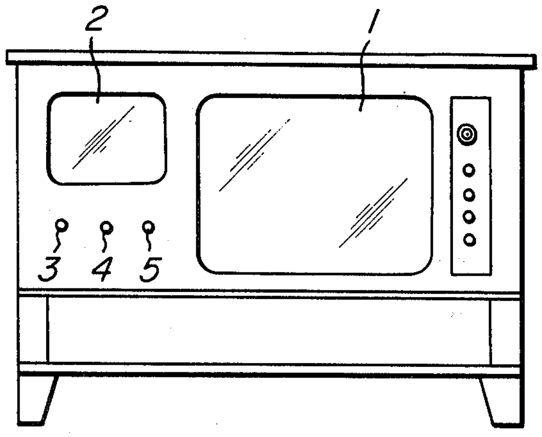
FIG. 1 is a front view of a television receiver embodying the invention.

Referring now to FIG. 1, numeral 1 designates a picture tube for the display of a broadcast television signal, numeral 2 a picture tube for the display of a recorded picture frame, numeral 3 a knob for the recording operation, numeral 4 a knob for the erasing operation, and numeral 5 a knob for zooming the recorded picture.

Figure 2:
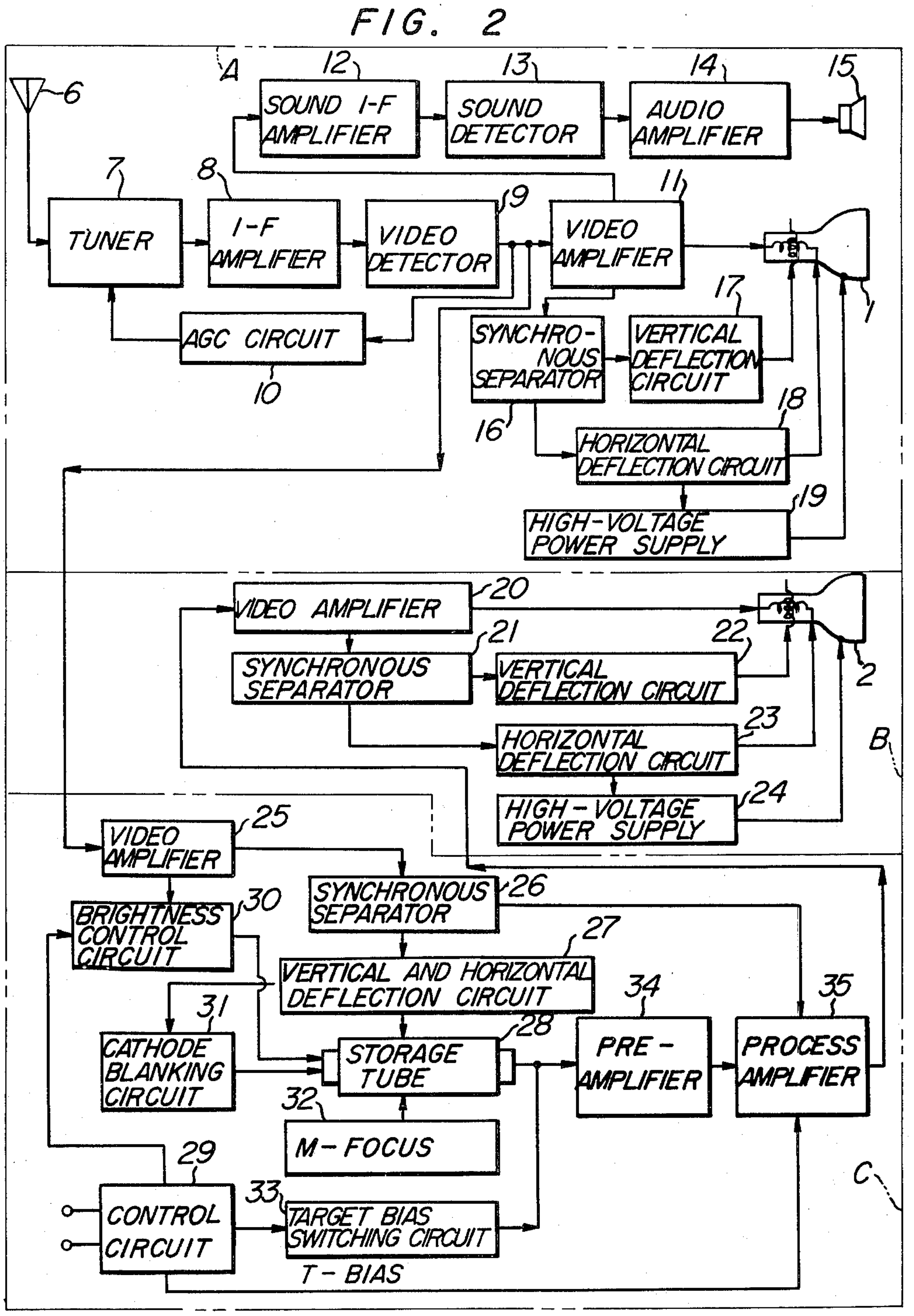
FIG. 2 is a block diagram showing the electric circuit of the same television receiver.

FIG. 2 shows a detailed inner circuit construction of the embodiment of FIG. 1. It comprises a display section A having the same construction as the usual television receiver, a static picture display section B for statically reproducing a recorded picture frame, and a picture recording section C for recording a desired picture frame.

The display section A comprises an antenna 6, a tuner 7, an i-f amplifier 8, a video detector 9, an AGC circuit 10, a video amplifier 11, a sound i-f amplifier 12, a sound detector 13, an audio amplifier 14, a loudspeaker 15, a sync separator 16, a vertical deflection circuit 17, a horizontal deflection circuit 18, and a high-voltage power supply 19.

The static picture display section B has a similar construction similar to part of the display section A. More particularly, it comprises a video amplifier 20, sync separator 21, a vertical deflection circuit 22, a horizontal deflection circuit 23, and a high-voltage power supply 24.

The picture recording section C comprises a video amplifier 25, to which the output of the video detector 9 is coupled, a sync separator 26, a vertical and horizontal deflection circuit 27 for a storage tube 28, a control circuit 29 to control the writing in and reading out of the storage tube 28, a brightness control circuit 30 for controlling the brightness of the storage tube 28, a cathode blanking circuit 31 for the storage tube 28, a magnetic focus control circuit 32 for the storage tube 28, a target bias switching circuit 33 for the storage tube 28, a pre-amplifier 34 connected to the storage tube 28, and a process amplifier 35 whose output is coupled to the video amplifier 20.

In the operation of the above construction of the embodiment, the television signal of a desired channel intercepted by the antenna 6 and selected by the tuner 7 is amplified through the i-f amplifier 8 and rectified through the video detector 9 for the reproduction of a picture at the picture tube 1 and the reproduction of sound at the loudspeaker 15.

The operation so far is the same as the usual television receiver. The following operation is featured by the present embodiment.

When a television picture desired to be statically observed appears on the picture tube 1, the recording knob 3 may be operated to operate the control circuit 29. The output of the control circuit 29 then controls the brightness control circuit 30, so that a specified frame of the video signal is extracted and subjected to brightness control for writing in the storage tube 28. At this time, deflection signals timed to sync signals in the television signal of a specified channel selected by the tuner 7 are supplied from the deflection circuit 27 to the storage tube 28.

After the writing operation is ended, the recorded picture information is automatically read out of the storage tube 28 for the display through the pre-amplifier 34, process amplifier 35 and video amplifier 20 on the picture tube 2 under the control of the control circuit 29. At this time, deflection signals timed to sync signals separated from the signal coupled to the video amplifier 20 are supplied from the deflection circuits 22 and 23 to the picture tube 2, so that the static picture read out of the storage tube 28 is displayed on the picture tube 2. The time required for the switching from the writing in in the storage tube 28 to the reading therefrom is extremely short since it can be effected merely by the switching of a voltage impressed on the storage tube without requiring any rewinding of magnetic tape that would be required in the usual video tape recorder.

In the display of the static picture on the picture tube 2, a zooming operation for enlarging the displayed picture may be simply and freely achieved through the manipulation of the zooming knob 5.

In actual practice, a recorded picture may appear on the picture tube 2 at least 33 milliseconds after the operation of the knob 3, and it may be continuously displayed for about 10 to 20 minutes. Also, by operating the erasing knob 4, the recorded picture may be erased in 100 to 150 milliseconds.

Figure 3:
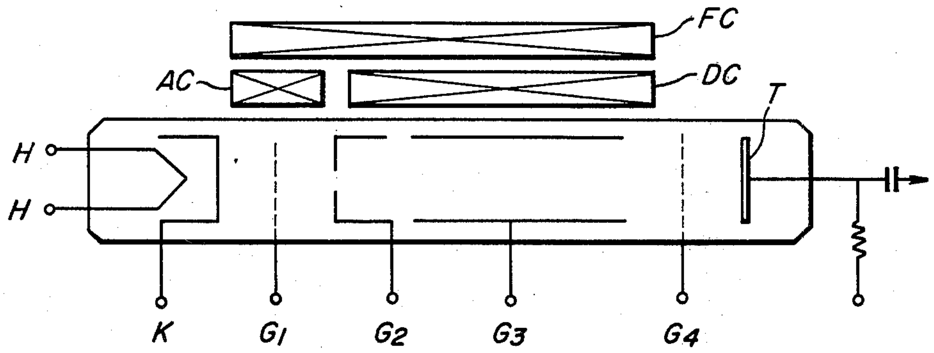
FIG. 3 is a schematic representation of a storage tube.

FIG. 3 shows a detailed construction of the storage tube 28 shown in FIG. 2. It has the function of recording a picture by storing a corresponding charge pattern on a silicon target electrode. Also, it is capable of reading and erasing the written picture information. Further, at the time of reading, desired zooming of the reproduced picture may be obtained by suitably reducing the deflection angle. In the Figure, reference character H designates a heater electrode, character K a cathode, character $G_1$ a control grid, character $G_2$ an accelerating electrode, character $G_3$ a focusing electrode, character $G_4$ a collector mesh, character T a silicon target electrode, character AC an alignment coil, character DC a deflection coil, and character FC a focusing coil.

In the instant embodiment, a monochromatic picture is displayed on the picture tube 2. However, by using three storage tubes respectively recording red, green and blue color signals in the picture recording section C and a color picture tube for the tube 2 it is possible to obtain static display of color pictures.

Also, a single picture tube may be used in place of the two picture tubes 1 and 2. In other words, the picture tube 2 may be dispensed with. In this case, when reproducing the recorded picture the signal read out of the storage tube 28 may be suitably switched for coupling to the picture tube 1 while temporarily stopping the reproduction of the broadcast television signal.

Figure 4:
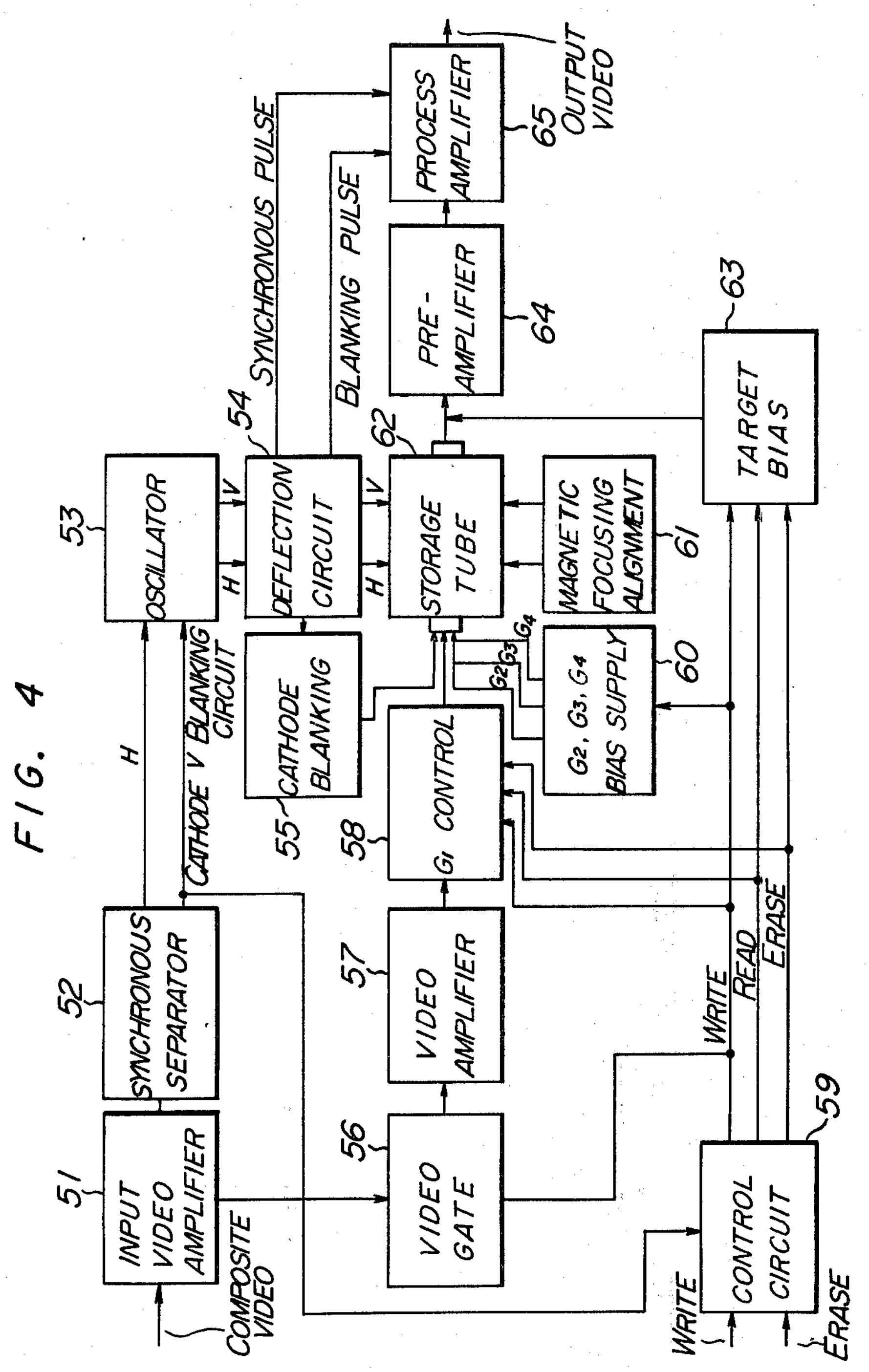
FIG. 4 is a block diagram showing a detailed construction of the block C in the circuit of FIG. 2.

FIG. 4 shows a detailed construction of the picture recording section C. In the Figure numeral 51 designates an input video amplifier using an emitter follower. It provides a composite video signal including sync signals through impedance conversion to the deflection system and to a video gate gating one frame of video signal to a video amplifier.

Numeral 52 designates a sync separator to separate horizontal and vertical sync pulses from the input video signal. The separated sync pulses are used to time a horizontal and vertical deflection oscillator 53, which supplies a vertical deflection sawtooth output and horizontal deflection pulse output to a deflection circuit 54. Horizontal and vertical blanking pulses and sync pulses are produced from flyback pulses in the deflection circuit 54, and are supplied to a process amplifier 65. The blanking pulses are supplied to a cathode blanking circuit 55, which is provided for blanking out horizontal and vertical retraces.

Numeral 56 designates a video gate for extracting one frame from the input video signal, and it is closed except for the writing time. The video signal extracted through the video gate is amplified by a video amplifier 57 to a predetermined level, and the amplified output is coupled to a $G_1$ control circuit 58 for the first grid $G_1$ of the storage tube 28. The $G_1$ control circuit 58 serves to provide write, read and erase biases, which are switched by respective control signals.

Numeral 61 designates a current source for providing steady current to the storage tube magnetic focusing coil and for regulating the electron beam alignment. The focus is also determined by the ratio between the voltages on the third grid $G_3$ and fourth grid $G_4$. Numeral 60 designates a power supply for the second, third and fourth grids $G_2$, $G_3$ and $G_4$. The second grid $G_2$ is for the acceleration of the electron beam. This bias on the third grid $G_3$ is slightly changed by control signals between the write-in time and read-out time since the focus is slightly different between writing and reading times.

Numeral 62 designates the storage tube, whose operation mode is determined not by the first grid bias alone but by the combination thereof with the target bias. The target bias is switched simultaneously with the first grid bias by a target bias circuit 63 in response to control signals from the control circuit. In the read state, the output video signal from the target is coupled to a pre-amplifier 64 for amplification and correction of frequency characteristics. The output of the pre-amplifier is coupled to the process amplifier 65, which rectifies the input and in which the rectified signal is combined with the blanking pulses to fix the pedestal level and also with vertical and horizontal sync pulses to produce a predetermined composite video signal.

Numeral 59 designates the control circuit. It can produce an extract pulse for one frame in synchronism with the vertical sync signal from its input write trigger signal and an erase pulse having a predetermined pulse interval from its input erase trigger signal. Unless the storage tube 26 is in the write or erase state, it is in the read state.

Figure 5:
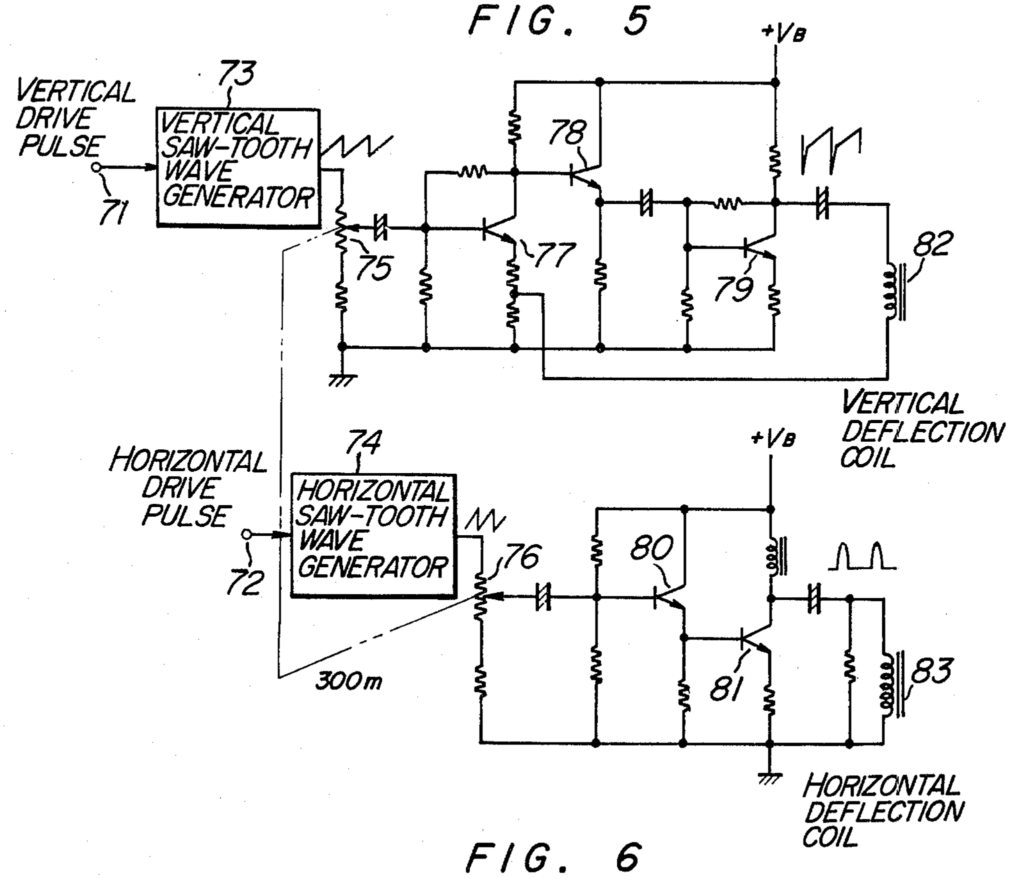
FIG. 5 is a circuit diagram of horizontal and vertical deflection circuits for the storage tube.

FIG. 5 shows an example of the deflection system, which uses class A amplifiers for both horizontal and vertical deflection circuits. The vertical deflection circuit is a negative feedback amplifier to which the deflection current is negatively fed back. The horizontal deflection circuit uses a choke coupled amplifier. Therefore, the inputs to these amplifiers are all saw-tooth waves, which are produced by respective saw-tooth wave generators 73 and 74 each of which consists of an integrating circuit of capacitor C and resistor R and an amplifier and which are driven by respective vertical and horizontal drive pulses added to respective terminals 71 and 72. The outputs of these saw-tooth generators 73 and 74 are voltage divided by respective variable resistors 75 and 76 which are ganged together. The resultant division voltages are amplified by respective amplifiers, one mainly consisting of transistors 77, 78 and 79 and the other consisting of transistors 80 and 81. The outputs of these amplifiers are respectively supplied to a vertical deflection coil 82 and to a horizontal deflection coil 83.

The variable resistors 75 and 76 are ganged together such that the ratio of their resistance is maintained constant as their resistances are varied. Thus, the displayed picture may be enlarged or reduced while always maintaining the picture area aspect ratio constant.

Figure 6:
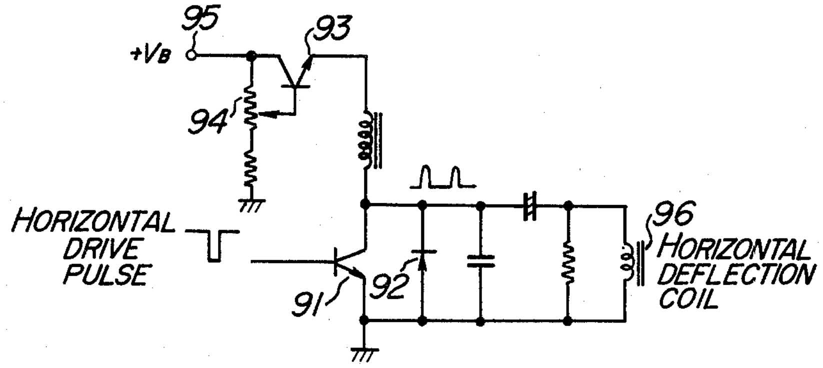
FIG. 6 is a circuit diagram of a horizontal deflection circuit in another embodiment of the invention.

FIG. 6 shows an example of the horizontal deflection circuit using a switching type circuit. In this circuit, flyback pulses are integrated through the switching action of a transistor 91 and an LC resonant circuit and a damper diode 92 to provide saw-tooth current. The amplitude of the saw-tooth current is proportional to the source voltage on the transistor 91. Thus, for zooming the base voltage on a transistor 93 is made variable through a variable resistor 94 for varying the source voltage appearing at a terminal 95 to a desired extent. Numeral 96 designates a horizontal deflection coil.

Figure 7:
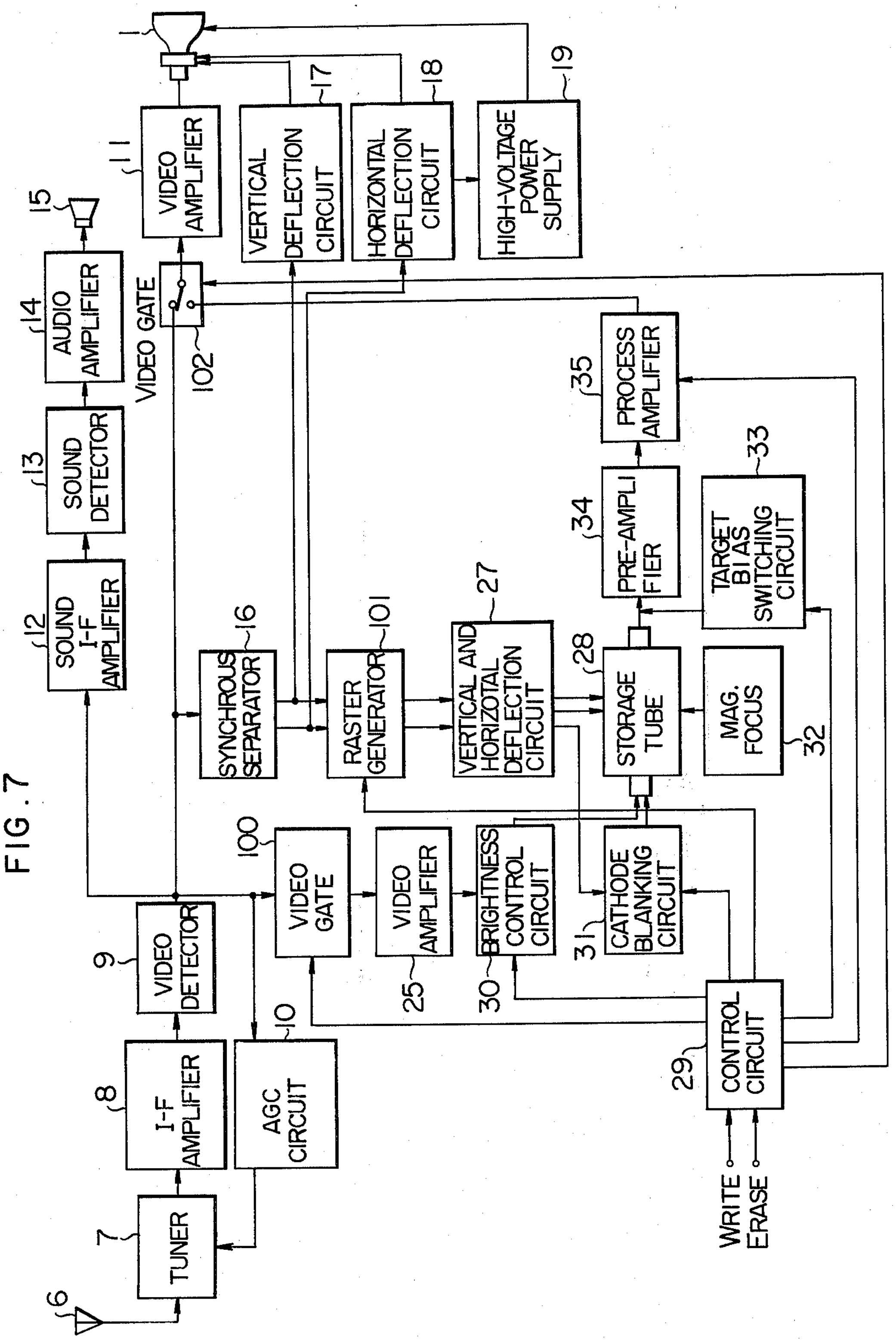
FIG. 7 is a block diagram showing another circuit of the same television receiver.

FIG. 7 shows another circuit which is similar to that of FIG. 2. Numeral 100 is a video gate operating to extract one frame at a time and controlled by the control circuit 29. Numeral 101 is a raster generator receiving horizontal and vertical synchronizing signals included in a television signal and generating a scan signal for effecting a raster scan on the storage tube 28. Numeral 102 is a video gate controlled by the control circuit 29 and which usually conducts the output of the detector 9 i.e., a video signal in a broadcasting television signal to the video amplifier 11. The gate 102 is switched, if required, so as to conduct a signal read out from the storage tube 28 to the video amplifier 11 through amplifiers 34 and 35. Thus, usually the broadcasting television picture can be displayed on a Brown tube 1, and when the video gate 102 is switched by the control circuit 29, a static picture of one frame recorded on the storage tube 28 can be displayed thereon.

It is to be understood that for the zooming it is only necessary to vary the deflection current. Thus, various other methods than above described may be considered to provide for the zooming; for instance it is possible to vary the gain of the saw-tooth wave generating circuits, to vary the time constant of the CR integrating circuit or to vary the source voltage on the integrating circuit to this end.

What we claim is:

1. A television receiver comprising: picture display means, picture recording means and static picture display means;

a. said picture display means including means to receive and demodulate a broadcast television signal, said means to receive and demodulate having an antenna for receiving the broadcast television signal, a tuner connected to the antenna and a video detector for demodulating the television signal, b. said picture recording means including a storage tube to record a particular frame of video signal and having a single electron gun and first vertical and horizontal deflection coils, first vertical and horizontal deflection means to vary the amount of deflection current passing through the first deflection coils of said storage tube at the time of reading out a recorded video signal therein and control means to read out the recorded signal of said storage tube repetitively, said first vertical and horizontal deflection means having two amplifiers connected to the respective first vertical and horizontal deflection coils of said storage tube and two variable resistors for coupling vertical and horizontal saw-tooth wave signals to said respective amplifiers, said two variable resistors being ganged together and controlled manually to control the deflection of a scanning spot on a target of said storage tube for the purpose of zooming a static picture, said control means automatically starting to read out the content of said storage tube after the particular frame of video signal is recorded in said storage tube, c. said static picture display means including a picture tube having second vertical and horizontal deflection coils for displaying the video signal read out or zoomed by said picture recording means, second vertical deflection means and second horizontal deflection means each causing deflection current to pass through the respective second vertical and horizontal deflection coils on said picture tube.

2. A television receiver comprising: picture display means, picture recording means and static picture display means;

a. said picture display means including means to receive and demodulate a broadcast television signal, said means to receive and demodulate having an antenna for receiving the broadcast television signal, a tuner connected to the antenna and a video detector for demodulating the television signal, b. said picture recording means including a storage tube to record a particular frame of video signal and having a single electron gun and first vertical and horizontal deflection coils, first vertical and horizontal deflection means to vary the amount of deflection current passing through the first deflection coils of said storage tube at the time of reading out a recorded signal therein and control means to read out the recorded signal of said storage tube repetitively, said first vertical and horizontal deflection means including means to obtain from flyback pulses a saw-tooth current supplied to the horizontal deflection coil of said storage tube, said means to obtain including means to integrate said flyback pulses, said means to integrate including a switching transistor, a damper diode and a resonant circuit of an inductor and a capacitor, said transistor being connected through a variable impedance element to a power supply, said variable impedance element supplying a source voltage on said transistor to control the deflection of a scanning spot on a target of said storage tube for zooming, said control means automatically starting to read out the content of said storage tube after the particular frame of video signal is recorded in said storage tube, c. said static picture display means including a picture tube having second vertical and horizontal deflection coils for displaying the video signal read out or zoomed by said picture recording means, second vertical deflection means and second horizontal deflection means, each causing deflection current to pass through the respective second vertical and horizontal deflection coils of said picture tube.

3. A television receiver comprising means to receive a television signal of a particular channel, means to demodulate the received television signal, a first picture tube for the display of a picture reproduced from the video signal in the demodulated television signal, means to extract a particular frame of said video signal, means to record the extracted video signal, means to read the recorded signal, said reading means including means to cause zooming of the recorded picture, and a second picture tube for the display of a static zoomed picture reproduced from the recorded signal.

4. A television receiver comprising means to receive a television signal of a particular channel, means to demodulate the received television signal, a picture tube for the display of a picture reproduced from the video signal in the demodulated television signal, means to extract a particular frame of said video signal, means to record the extracted video signal, means to read the recorded signal, said reading means including means to cause zooming of the recorded picture, and switching means to switch from the display on said picture tube of a picture reproduced from the television signal being received to the display on said picture tube of a static picture reproduced from a recorded signal at the time of reading of said recording means.

* * * * *